United States Patent
Shih et al.

(10) Patent No.: US 12,375,754 B2
(45) Date of Patent: Jul. 29, 2025

(54) DISPLAY DEVICE AND SIGNAL SOURCE SWITCHING METHOD THEREOF

(71) Applicant: Qisda Corporation, Taoyuan (TW)

(72) Inventors: Bo-Wei Shih, Taoyuan (TW); Li-Chun Chen, Taoyuan (TW); I-Hsuan Lai, Taoyuan (TW)

(73) Assignee: Qisda Corporation, Taoyuan (TW)

(*) Notice: Subject to any disclaimer, the term of this patent is extended or adjusted under 35 U.S.C. 154(b) by 43 days.

(21) Appl. No.: 18/336,925

(22) Filed: Jun. 16, 2023

(65) Prior Publication Data

US 2024/0098330 A1    Mar. 21, 2024

(30) Foreign Application Priority Data

Sep. 16, 2022    (CN) .......................... 202211131736.3

(51) Int. Cl.
*H04N 21/4363*    (2011.01)
*H04N 5/44*    (2011.01)

(52) U.S. Cl.
CPC ......... *H04N 21/43635* (2013.01); *H04N 5/44* (2013.01)

(58) Field of Classification Search
CPC ....... H04N 21/43635; H04N 21/44227; H04N 5/44; G09G 5/006
See application file for complete search history.

(56) References Cited

U.S. PATENT DOCUMENTS

| | | | | |
|---|---|---|---|---|
| 8,175,298 | B2* | 5/2012 | Mitani | H04N 5/60 381/74 |
| 8,201,211 | B2* | 6/2012 | Proust | G06F 21/575 707/999.203 |
| 8,351,624 | B2* | 1/2013 | Motomura | H04N 21/43635 348/706 |
| 8,838,911 | B1* | 9/2014 | Hubin | G11B 20/10527 711/147 |
| 2006/0161958 | A1* | 7/2006 | Choung | H04N 21/4122 725/78 |
| 2007/0046835 | A1* | 3/2007 | Kim | H04N 21/42204 348/731 |
| 2008/0063216 | A1* | 3/2008 | Sakata | H04S 3/008 381/80 |
| 2008/0309830 | A1* | 12/2008 | Motomura | H04N 21/43635 348/E5.122 |
| 2008/0320545 | A1* | 12/2008 | Schwartz | H04N 7/17318 725/135 |

(Continued)

*Primary Examiner* — Michael B. Pierorazio

(57) ABSTRACT

A display device and a signal source switching method therefore are provided. The display device is connected with a first signal source device and a second signal source device and includes a switching circuit, a receiver circuit and a control circuit. The switching circuit includes a first connection port and a second connection port, which are respectively connected to the first signal source device and the second signal source device. When the control circuit receives a signal source switching command, the control circuit records a current operating state of each of the first signal source device and the second signal source device. When the control circuit receives an active source command from the first signal source device, the control circuit refers to the current operating state to control the switching circuit to switch the image signal source to the first signal source device or the second signal source device.

15 Claims, 6 Drawing Sheets

(56) References Cited

U.S. PATENT DOCUMENTS

| | | | |
|---|---|---|---|
| 2010/0315553 A1* | 12/2010 | Takatsuji | G06F 21/10 348/E9.034 |
| 2010/0321479 A1* | 12/2010 | Yang | H04N 21/816 348/51 |
| 2011/0051002 A1* | 3/2011 | Oh | H04N 5/765 348/569 |
| 2011/0068736 A1* | 3/2011 | Chartier | H02J 7/00 320/137 |
| 2011/0113442 A1* | 5/2011 | Kikkawa | G09G 5/006 725/25 |
| 2011/0134338 A1* | 6/2011 | Toba | H04N 5/765 348/734 |
| 2011/0142245 A1* | 6/2011 | Toba | G11B 20/10527 381/22 |
| 2011/0176057 A1* | 7/2011 | Okamura | H04N 21/439 348/554 |
| 2011/0234916 A1* | 9/2011 | Fujita | H04N 5/60 348/E5.122 |
| 2012/0002562 A1* | 1/2012 | Kawade | H04N 5/765 370/252 |
| 2012/0030728 A1* | 2/2012 | Yukawa | G06F 9/44 725/151 |
| 2012/0042346 A1* | 2/2012 | Yoshida | H04N 21/4363 725/81 |
| 2012/0136612 A1* | 5/2012 | Vanderhoff | H04N 17/004 702/119 |
| 2012/0188456 A1* | 7/2012 | Kuroyanagi | H04N 5/765 348/731 |
| 2012/0307157 A1* | 12/2012 | Utsunomiya | H04N 21/43622 348/707 |
| 2013/0021536 A1* | 1/2013 | Kamida | H04N 21/43622 348/739 |
| 2013/0051578 A1* | 2/2013 | Chu | H04B 1/123 381/94.1 |
| 2013/0051584 A1* | 2/2013 | Higuchi | H04N 21/8106 381/123 |
| 2013/0086622 A1* | 4/2013 | Narushima | H04N 21/43635 725/138 |
| 2013/0159751 A1* | 6/2013 | Theoduloz | H04N 5/765 713/323 |
| 2013/0223538 A1* | 8/2013 | Wang | H04N 21/43637 375/E7.027 |
| 2013/0292311 A1* | 11/2013 | Shaw | E03F 5/042 137/15.01 |
| 2014/0193134 A1* | 7/2014 | Maeda | H04N 21/43072 386/231 |
| 2014/0368740 A1* | 12/2014 | Roberts | H04N 21/43635 348/705 |
| 2015/0074729 A1* | 3/2015 | Kim | H04N 21/44227 725/80 |
| 2015/0077633 A1* | 3/2015 | Lee | H04N 21/4392 348/515 |
| 2017/0303000 A1* | 10/2017 | Kim | H04N 19/56 |
| 2019/0058914 A1* | 2/2019 | Satheesh | H04N 21/8186 |

\* cited by examiner

DISPLAY DEVICE AND SIGNAL SOURCE SWITCHING METHOD THEREOF

CROSS-REFERENCE TO RELATED APPLICATION

This application claims the priority benefit of China application serial no. 202211131736.3, filed on Sep. 16, 2022. The entirety of the above-mentioned patent application is hereby incorporated by reference herein and made a part of this specification.

BACKGROUND

Technical Field

The disclosure relates to an electronic device, and in particular relates to a display device and a signal source switching method therefore.

Description of Related Art

High definition multimedia interface (HDMI) has become the digital interface standard of audio-visual electronic products, and the application of HDMI may be seen everywhere in daily life. Currently, it is quite common to use a display device that supports HDMI to play various source devices. Therefore, in order to increase the number of HDMI ports of the display device, a switching circuit coupled with the HDMI receiver may be disposed in the display device. The output end of the switching circuit is used to connect the input end of the HDMI receiver, and the multiple input ports of the switching circuit are respectively used to connect multiple signal source devices. In other words, the disposition of the switching circuit may directly expand the number of HDMI ports of the display device, so that the user does not need to manually replace the signal source device actually connected to the display device as much as possible.

However, for the design of the above-mentioned switching circuit in the display device, multiple signal source devices connected to the switching circuit may all receive a hot plug detect (HPD) signal from the HDMI receiver in response to the signal source switching command sent by the user. In this case, multiple signal source devices connected to the switching circuit may send the active source command of the consumer electronics control (CEC) standard at the same time, thus causing the display device to fail to switch smoothly to the signal source device that the user really wants to use.

SUMMARY

The disclosure provides a display device and a signal source switching method thereof, which may solve the above technical problems.

An embodiment of the disclosure provides a display device for connecting a first signal source device and a second signal source device, and includes a switching circuit, a receiver circuit, and a control circuit. The switching circuit includes a first connection port and a second connection port, and the first connection port and the second connection port are respectively correspondingly connected to the first signal source device and the second signal source device. The receiver circuit is coupled to the switching circuit. The control circuit is coupled to the switching circuit and the receiver circuit. When the control circuit receives a signal source switching command, the control circuit records a current operating state of each of the first signal source device and the second signal source device. When the control circuit receives an active source command sent by the first signal source device, the control circuit refers to the current operating state of the first signal source device to control the switching circuit to switch the image signal source to the first signal source device or the second signal source device.

In an embodiment of the disclosure, the first connection port and the second connection port are multiple HDMI connection ports meeting an HDMI standard, and the active source command includes a CEC command meeting a CEC standard.

In an embodiment of the disclosure, the control circuit records the current operating state of the first signal source device according to a voltage signal of a power pin of the first connection port, and records the current operating state of the second signal source device according to a voltage signal of a power pin of the second connection port.

In an embodiment of the disclosure, when the current operating state of the first signal source device is a power-on state, the control circuit ignores the active source command sent by the first signal source device according to the signal source switching command, and controls the switching circuit to configure the second signal source device indicated by the signal source switching command as the image signal source.

In an embodiment of the disclosure, when the control circuit receives the signal source switching command, the first signal source device receives a hot plug detect signal to switch from a first level to a second level through the switching circuit, so that the first signal source device sends the active source command.

In an embodiment of the disclosure, when the current operating state of the first signal source device is a power-off state, the control circuit controls the switching circuit to configure the first signal source device as the image signal source according to the active source command.

In an embodiment of the disclosure, the first signal source device sends the active source command in response to the power-on state.

From another point of view, the embodiment of the disclosure provides a signal source switching method, which is applicable to a display device including a switching circuit. The switching circuit includes multiple connection ports connected to multiple signal source devices, and the signal source devices include a first signal source device and a second signal source device. The method includes the following operation. When a signal source switching command is received, a current operating state of each of the signal source devices is recorded. When an active source command sent by the first signal source device is received, the current operating state of the first signal source device is referenced to control the switching circuit to switch the image signal source to the first signal source device or the second signal source device.

Based on the above, in response to receiving the signal source switching command, the display device according to the embodiments of the disclosure may record the current operating state of each of the signal source devices in real time. Moreover, in response to receiving the active source command sent by the first signal source device, the display device according to various embodiments of the disclosure may refer to the recorded current operating state of the first signal source device to switch the image signal source of the display device. Based on this, the switching result of the image signal source of the display device may meet the expectation of the user, thereby improving the user experience.

In order to make the above-mentioned features and advantages of the disclosure comprehensible, embodiments accompanied with drawings are described in detail below.

DETAILED DESCRIPTION OF DISCLOSED EMBODIMENTS

Figure 1:
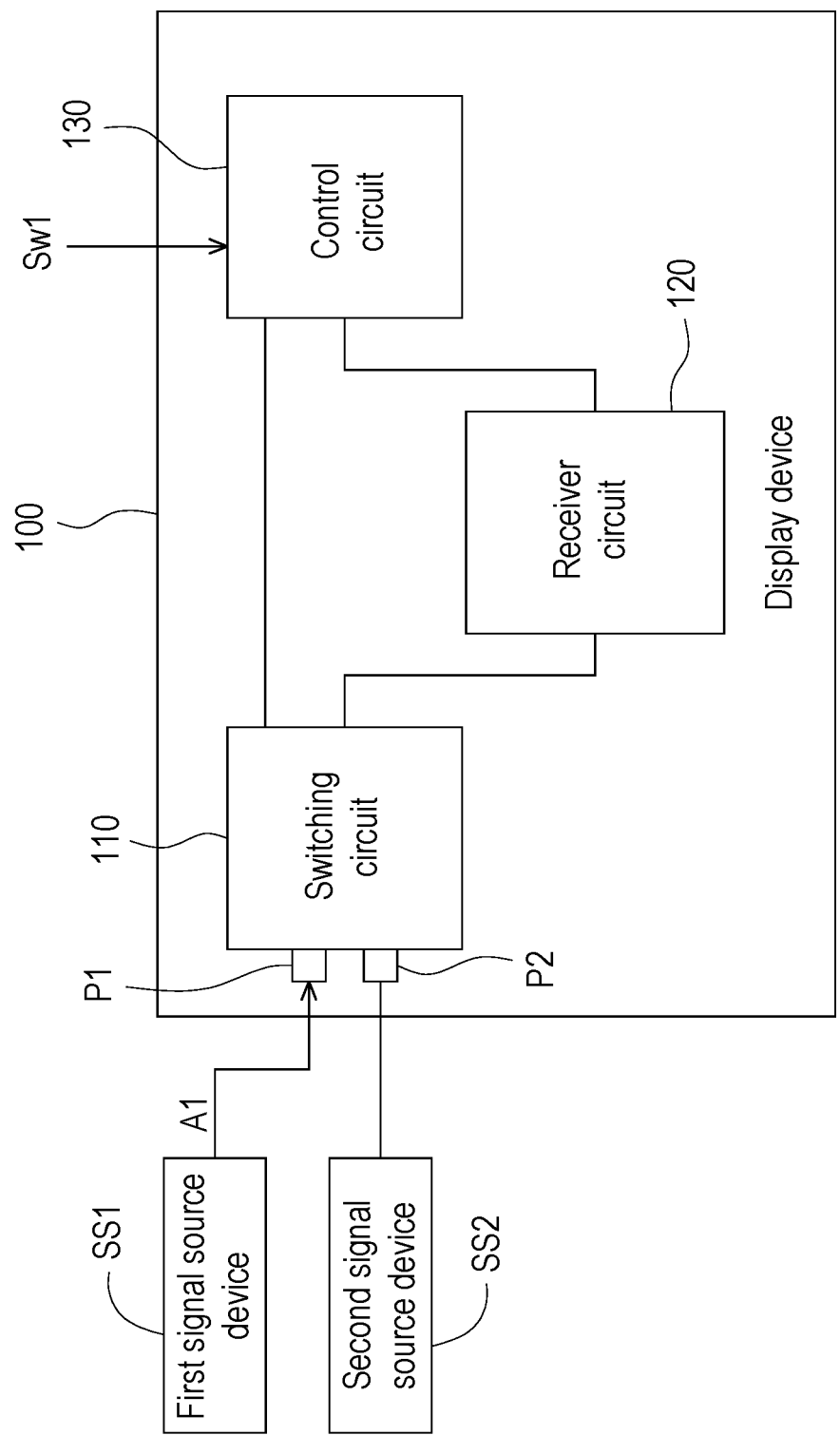
FIG. 1 is a block schematic diagram of a display device according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means.

Terms "first," "second", "third" and the like mentioned in the full text (including the scope of the patent application) of the description of this application are used only to name the elements and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a block schematic diagram of a display device according to an embodiment of the disclosure. Referring to FIG. 1, the display device 100 is used to connect the first signal source device SS1 and the second signal source device SS2, and may display image content provided by the first signal source device SS1 or the second signal source device SS2. The display device 100 is, for example, a projector, a television, or a desktop monitor, etc., and the disclosure is not limited thereto. The first signal source device SS1 and the second signal source device SS2 are, for example, gaming consoles, computers, DVD players, or set-top boxes, etc., and the disclosure is not limited thereto. The display device 100 includes a switching circuit 110, a receiver circuit 120, and a control circuit 130.

The switching circuit 110 may include multiple connection ports connected to multiple signal source devices. As shown in FIG. 1, the switching circuit 110 includes a first connection port P1 and a second connection port P2. The first connection port P1 and the second connection port P2 are respectively correspondingly connected to the first signal source device SS1 and the second signal source device SS2. In some embodiments, the first connection port P1 and the second connection port P2 may be multiple HDMI connection ports meeting the HDMI standard. That is, the multiple input ports of the switching circuit 110 may be multiple HDMI ports for connecting multiple signal source devices.

It should be noted that, in order to clearly illustrate the details of the implementation of the disclosure, the embodiment in FIG. 1 only uses two signal source devices and a switching circuit 110 with two connection ports as an example for illustration, but the disclosure is not limited thereto. In other embodiments, the display device 100 may be connected to more than two signal source devices, and the switching circuit 110 may also include more than two connection ports.

The receiver circuit 120 is coupled to the switching circuit 110. More specifically, the output end of the switching circuit 110 may be connected to the input end of the receiver circuit 120 to transmit the image data signal provided by the first signal source device SS1 or the second signal source device SS2 to the receiver circuit 120. In some embodiments, the receiver circuit 120 may be an HDMI receiver for decoding a transition minimized differential signal (TMDS) received from a TMDS data channel.

The control circuit 130 is coupled to the switching circuit 110 and the receiver circuit 120. In some embodiments, the control circuit 130 may receive the signal source switching command Sw1 sent by the user by controlling a remote controller, a control panel, or other input devices. The signal source switching command Sw1 is used to switch the image signal source of the display device 100, and the display device 100 may display according to the image data signal of the image signal source. More specifically, the control circuit 130 may control the switching operation of the switching circuit 110 in response to receiving the signal source switching command Sw1, so that the switching circuit 110 selectively outputs the image data signal provided by the first signal source device SS1 or the second signal source device SS2 to the receiver circuit 120. In addition, in some embodiments, the control circuit 130 may support the CEC standard to receive or send the CEC command, and the CEC standard allows the user to use a single input device (e.g., a remote controller) to control various electronic devices connected to each other through HDMI.

Figure 2:
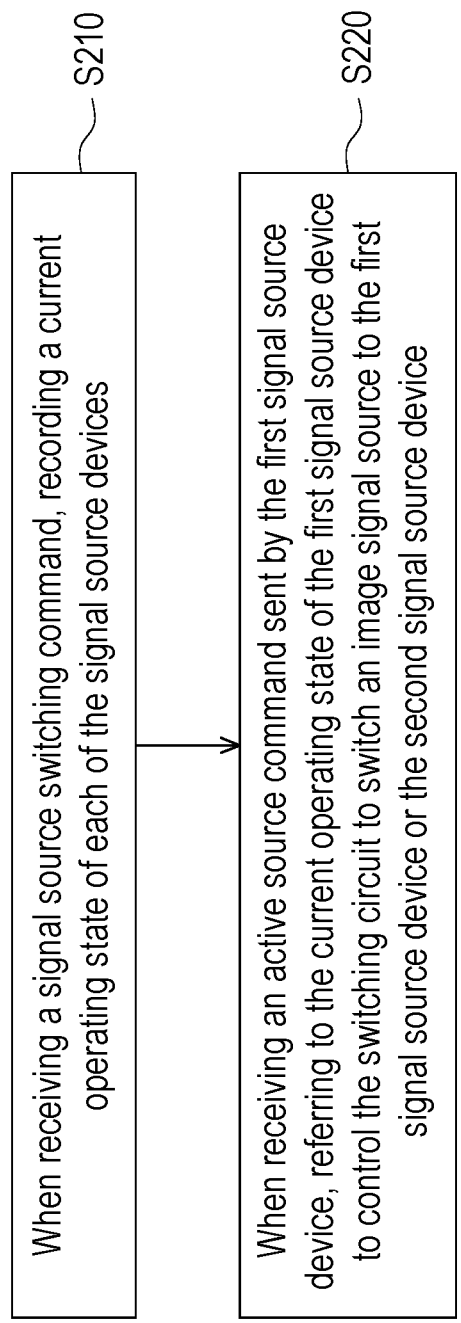
FIG. 2 is a schematic flowchart of a signal source switching method of a display device according to an embodiment of the disclosure.

FIG. 2 is a schematic flowchart of a signal source switching method of a display device according to an embodiment of the disclosure. The signal source switching method shown in FIG. 2 is applicable to the display device 100 shown in FIG. 1, please refer to FIG. 1 and FIG. 2.

In step S210, when the control circuit 130 receives a signal source switching command Sw1, the control circuit 130 records a current operating state of each of the first signal source device SS1 and the second signal source device SS2. The current operating state may be a power-off state or a power-on state. In other words, in response to receiving the signal source switching command Sw1, the control circuit 130 may record the current operating state of the first signal source device SS1 and the current operating state of the second signal source device SS2.

In some embodiments, the control circuit 130 may record the current operating state of each of the signal source devices according to the voltage signal of the power pin of each of the connection ports of the switching circuit 110. As shown in FIG. 1, the control circuit 130 may record the current operating state of the first signal source device SS1 according to a voltage signal of a power pin of the first connection port P1, and record the current operating state of the second signal source device SS2 according to a voltage signal of a power pin of the second connection port P2. The aforementioned power pin is, for example, the pin numbered 18 in the HDMI type A standard. Taking the first signal source device SS1 as an example, when the first signal source device SS1 is in the power-on state, the first signal source device SS1 may provide a 5V voltage signal to the switching circuit 110 through the power pin of the first connection port P1. When the first signal source device SS1 is in the power-off state, the first signal source device SS1 does not provide a 5V voltage signal to the switching circuit 110 through the power pin of the first connection port P1.

Therefore, according to the voltage signal of the power pin of the first connection port P1 and the voltage signal of the power pin of the second connection port P2, the control circuit 130 may know and record that the current operating states of each of the first signal source device SS1 and the second signal source device SS2 are the power-off state or the power-on state. In some embodiments, the control circuit 130 may record the current operating states of each of these signal source devices in a memory element, and record corresponding values according to whether the current operating states are the power-off state or the power-on state.

In step S220, when the control circuit 130 receives an active source command A1 sent by the first signal source device SS1, the control circuit 130 may refer to the current operating state of the first signal source device SS1 to control the switching circuit 110 to switch the image signal source to the first signal source device SS1 or the second signal source device SS2. Afterwards, the display device 100 may display an image according to the image data signal of the image signal source.

In some embodiments, the active source command A1 may include a CEC command meeting the CEC standard, and is transmitted through the CEC pin of the first connection port P1. The aforementioned CEC pin is, for example, the pin numbered 13 in the HDMI type A standard. Furthermore, the first signal source device SS1 may send the active source command A1 because it is powered on or receives a hot plug detect (HPD) signal sent by the receiver circuit 120. The hot plug detect signal is a detection signal generated by the receiver circuit 120 of the display device 100 and output to the first signal source device SS1, which is used to detect whether the first signal source device SS1 is connected to or disconnected from the display device 100.

In response to receiving the active source command A1 sent by the first signal source device SS1, the control circuit 130 may refer to the current operating state of the first signal source device SS1 to control the switching operation of the switching circuit 110. More specifically, the control circuit 130 may refer to the current operating state of the first signal source device SS1 to control the switching circuit 110 to selectively output the image data signal of the first signal source device SS1 or the image data signal of the second signal source device SS2 to the input end of the receiver circuit 120, to configure the first signal source device SS1 or the second signal source device SS2 as the image signal source of the display device 100. Based on this, by recording and referring to the current operating state of the first signal source device SS1, the control circuit 130 may switch the image signal source of the display device 100 to meet the expected result of the user.

In the following, the recorded current operating state of the first signal source device SS1 as the power-on state and the power-off state will be illustrated clearly with respective embodiments.

Figure 3:
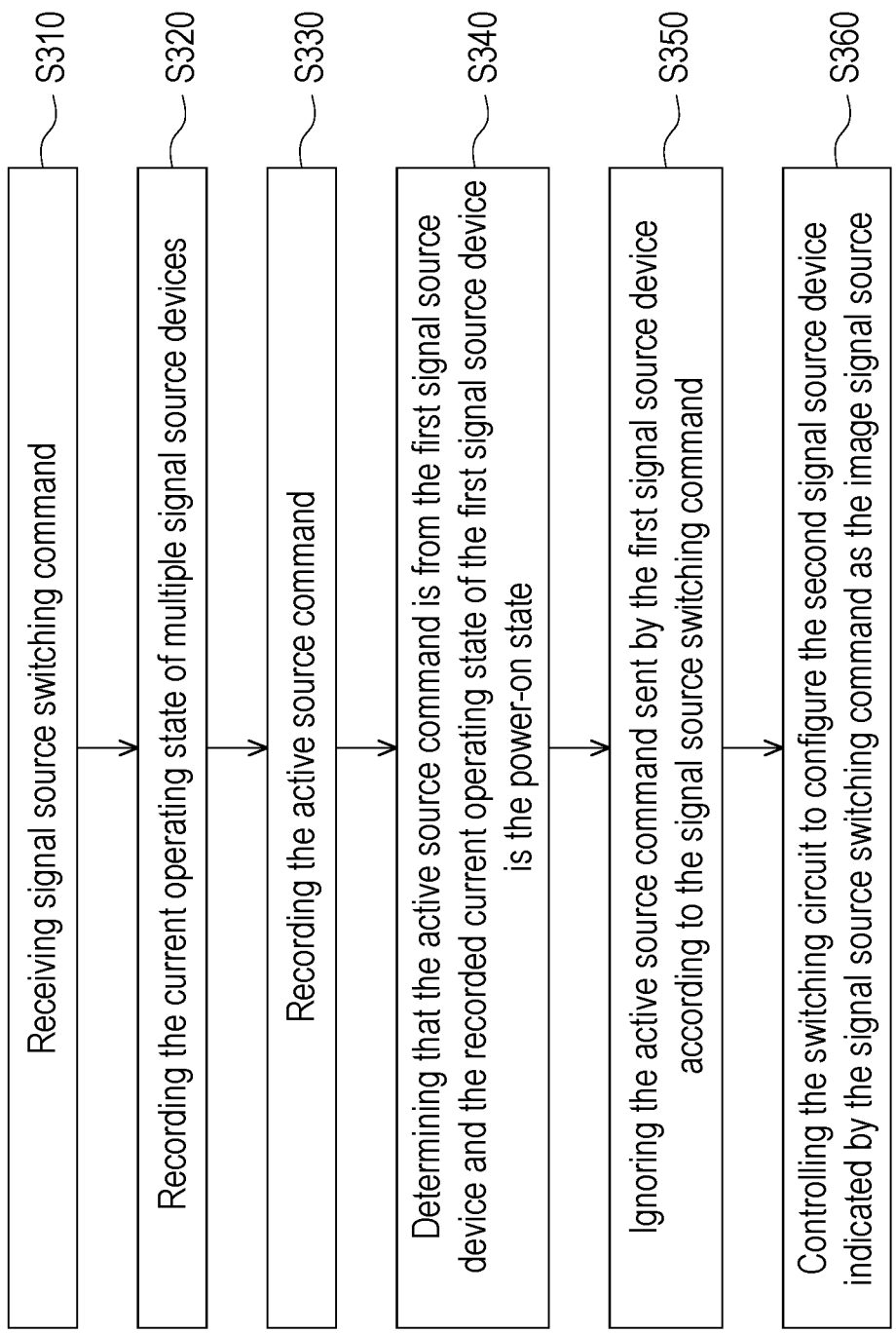
FIG. 3 is a schematic flowchart of a signal source switching method of a display device according to an embodiment of the disclosure.

FIG. 3 is a schematic flowchart of a signal source switching method of a display device according to an embodiment of the disclosure. The signal source switching method shown in FIG. 3 is applicable to the display device 100 shown in FIG. 1, please refer to FIG. 1 and FIG. 3.

In step S310, the control circuit 130 receives the signal source switching command Sw1. The signal source switching command Sw1 may indicate the second signal source device SS2 to be the image signal source of the display device 100.

In step S320, when the control circuit 130 receives the signal source switching command Sw1, the control circuit 130 records the current operating states of each of the multiple signal source devices. As shown in FIG. 1, the control circuit 130 respectively records the current operating state of the first signal source device SS1 and the current operating state of the second signal source device SS2.

It should be noted that, in the implementation example shown in FIG. 3, when the control circuit 130 receives the signal source switching command Sw1, the first signal source device SS1 receives a hot plug detect signal to switch from a first level to a second level through the switching circuit 110, so that the first signal source device SS1 sends the active source command A1. More specifically, when the control circuit 130 receives the signal source switching command Sw1, the control circuit 130 controls the switching circuit 110 to perform the switching operation, therefore both the first signal source device SS1 and the second signal source device SS2 connected to the switch circuit 110 may receive the hot plug detect signal to switch from a first level to a second level through the switch circuit 110. For example, the hot plug detect signal may be transmitted through the hot plug pin of the first port P1. The aforementioned hot plug pin is, for example, the pin numbered 13 in the HDMI type A standard.

Next, in step S330, the control circuit 130 may receive the active source command A1 from the first signal source device SS1 through the switching circuit 110. In the implementation example of FIG. 3, the first signal source device SS1 sends the active source command A1 in response to the hot plug detect signal to switch from the first level to the second level. Since the first signal source device SS1 and the second signal source device SS2 each have a corresponding CEC physical address, the control circuit 130 may determine the sender of the active source command A1 according to the CEC physical address in the active source command A1.

In step S340, the control circuit 130 may determine that the active source command A1 is from the first signal source device SS1 and the recorded current operating state of the first signal source device SS1 is the power-on state. In the implementation example of FIG. 3, when the control circuit 130 determines that the active source command A1 comes from the first signal source device SS1, the control circuit 130 may further confirm that the recorded current operating state of the first signal source device SS1 is the power-on state.

In step S350, when the current operating state of the first signal source device SS1 is the power-on state, the control circuit 130 may ignore the active source command A1 sent by the first signal source device SS1 according to the signal source switching command Sw1. Therefore, in step S360, the control circuit 130 may control the switching circuit 110 to configure the second signal source device SS2 indicated by the signal source switching command Sw1 as the image signal source. That is, the control circuit 130 may refer to the recorded current operating state of the first signal source device SS1 and switch the image signal source of the display device 100 according to the signal source switching command Sw1.

It may be seen from this that when the signal source switching command Sw1 indicates that the second signal source device SS2 is the image signal source of the display device 100, but the control circuit 130 receives the active source command A1 sent by the first signal source device SS1, the control circuit 130 may refer to the recorded current operating state of the first signal source device SS1 as the power-on state, and ignore the active source command A1 sent by the first signal source device SS1 according to the signal source switching command Sw1. Thereby, the situation that the image signal source of the display device 100 cannot be switched to the second signal source device SS2 may be avoided.

It should be noted that, in some embodiments, when the control circuit 130 receives the signal source switching command Sw1, the second signal source device SS2 may also send an active source command and the recorded current operating state of the second signal source device SS2 is also the power-on state. However, because the signal source switching command Sw1 indicates that the second signal source device SS2 is the image signal source of the display device 100, the control circuit 130 may not ignore the active source command sent by the second signal source device SS2 according to the signal source switching command Sw1.

Figure 4:
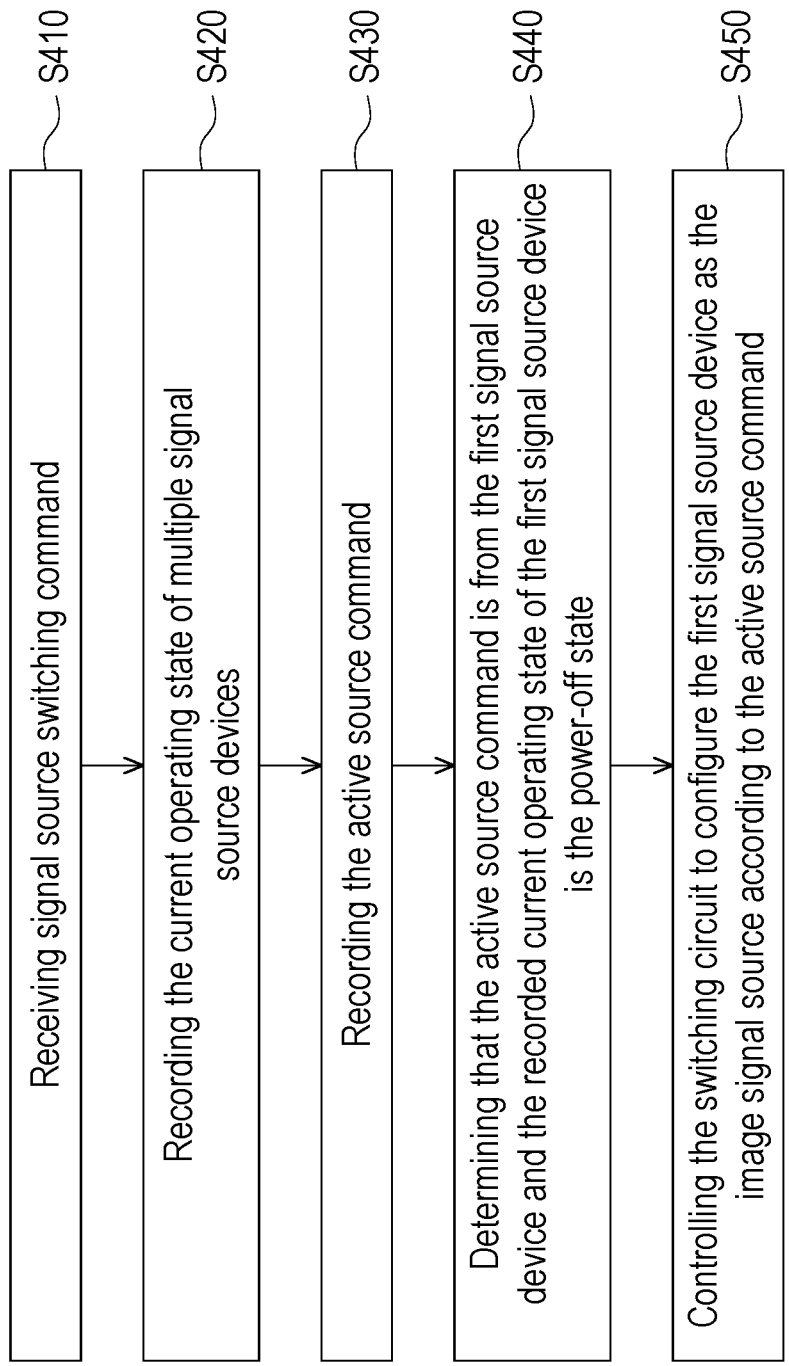
FIG. 4 is a schematic flowchart of a signal source switching method of a display device according to an embodiment of the disclosure.

FIG. 4 is a schematic flowchart of a signal source switching method of a display device according to an embodiment of the disclosure. The signal source switching method shown in FIG. 4 is applicable to the display device 100 shown in FIG. 1, please refer to FIG. 1 and FIG. 4.

In step S410, the control circuit 130 receives the signal source switching command Sw1. In step S420, when the control circuit 130 receives the signal source switching command Sw1, the control circuit 130 records the current operating states of each of the multiple signal source devices. As shown in FIG. 1, the control circuit 130 respectively records the current operating state of the first signal source device SS1 and the current operating state of the second signal source device SS2.

It should be noted that, in the implementation example of FIG. 4, after the control circuit 130 records the current operating states of each of the signal source devices, the first signal source device SS1 sends the active source command A1 in response to the power-on state. More specifically, when the power of the first signal source device SS1 is powered on, the first signal source device SS1 sends the active source command A1 through the first connection port P1.

In step S430, the control circuit 130 may receive the active source command A1 from the first signal source device SS1 through the switching circuit 110. The control circuit 130 may determine the sender of the active source command A1 according to the CEC physical address in the active source command A1.

In step S440, the control circuit 130 determines that the active source command A1 is from the first signal source device SS1 and the recorded current operating state of the first signal source device SS1 is the power-off state. In the implementation example of FIG. 4, when the control circuit 130 determines that the active source command A1 comes from the first signal source device SS1, the control circuit 130 may further confirm that the recorded current operating state of the first signal source device SS1 is the power-off state.

In step S450, when the current operating state of the first signal source device SS1 is the shutdown state, the control circuit 130 controls the switching circuit 110 to configure the first signal source device SS1 as the image signal source of the display device 100 according to the active source command A1. That is, the control circuit 130 may refer to the recorded current operating state of the first signal source device SS1 and switch the image signal source of the display device 100.

It may be seen from this that no matter which signal source device is indicated by the signal source switching command Sw1 to be the image signal source of the display device 100, in response to the recorded current operating state of the first signal source device SS1 that sent the active source command A1 is the power-off state, the control circuit 130 may control the switching circuit 110 to configure the first signal source device SS1 as the image signal source of the display device 100 according to the active source command A1. In this way, the user may automatically switch the image signal source of the display device 100 by powering on the signal source device.

Figure 5:
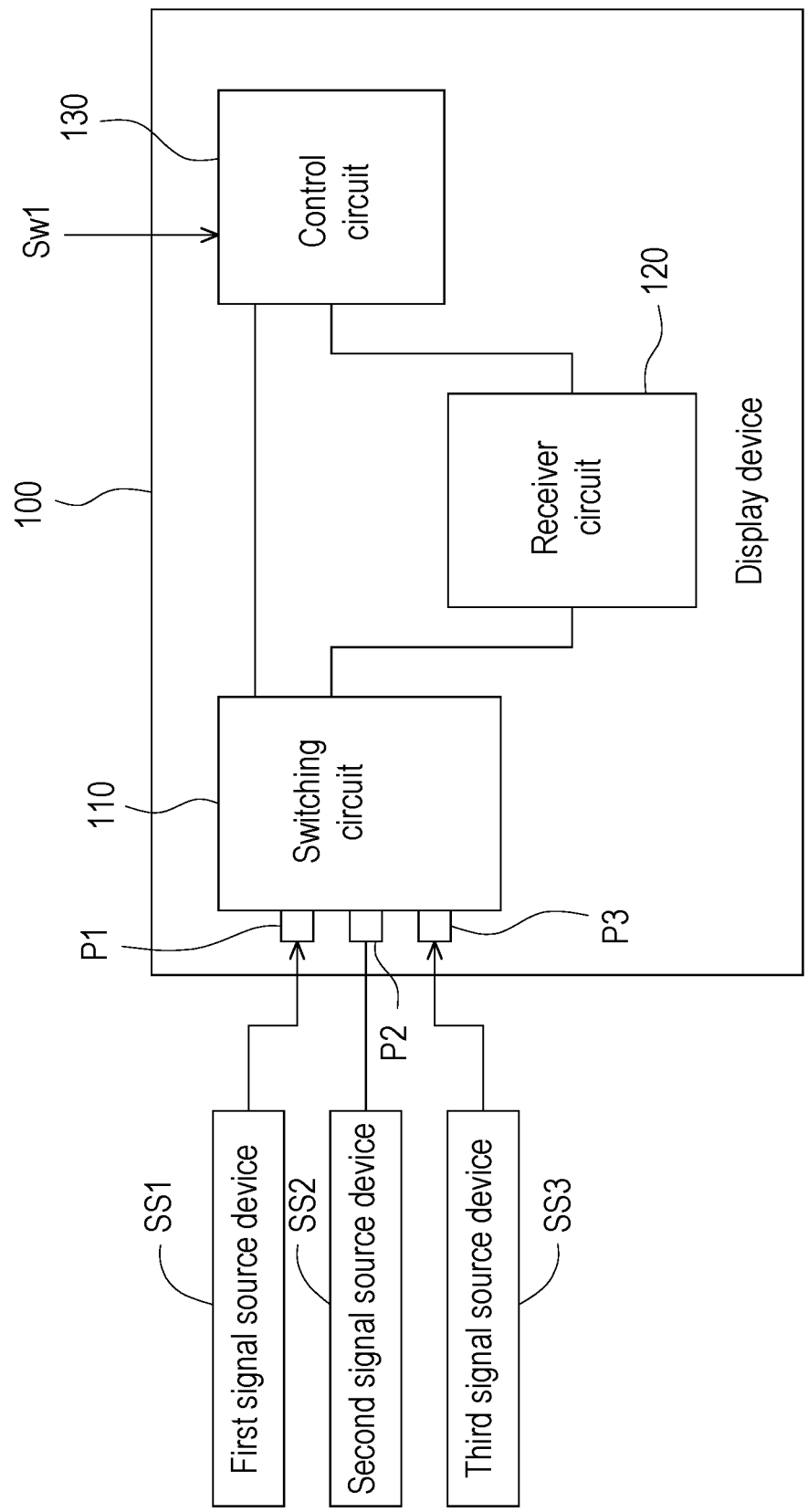
FIG. 5 is a block schematic diagram of a display device according to an embodiment of the disclosure.

FIG. 5 is a block schematic diagram of a display device according to an embodiment of the disclosure. Referring to FIG. 5, the difference from the embodiment shown in FIG. 1 is that the display device 100 may be connected to three signal source devices, which are the first signal source device SS1, the second signal source device SS2, and the third signal source device SS3. Correspondingly, in addition to the first connection port P1 and the second connection port P2, the switching circuit 110 may further include a third connection port P3 correspondingly connected to the third signal source device SS3. In addition, the rest of the elements shown in FIG. 5 may refer to the relevant description of FIG. 1 by analogy, so details are not repeated herein.

Figure 6:
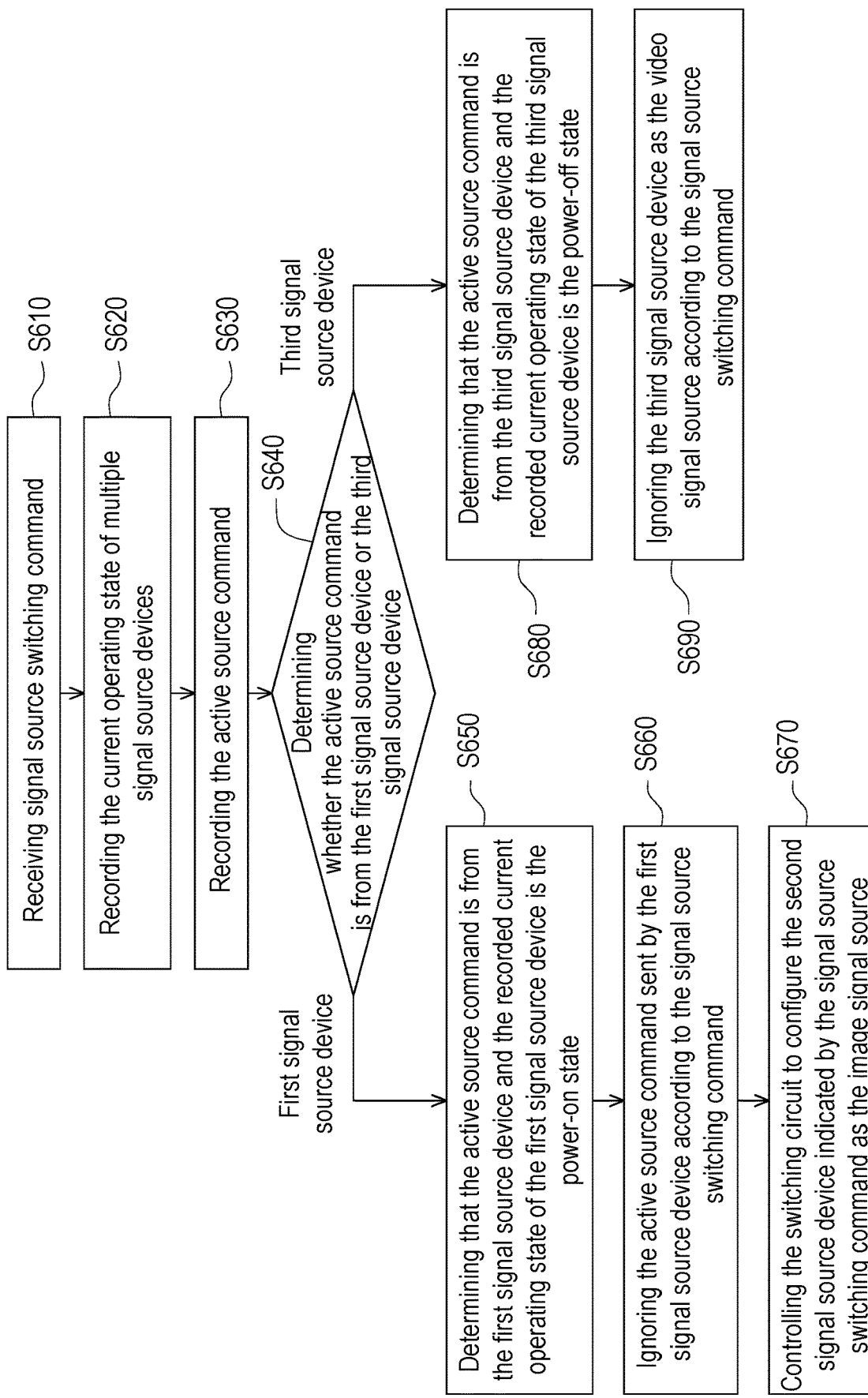
FIG. 6 is a schematic flowchart of a signal source switching method of a display device according to an embodiment of the disclosure.

FIG. 6 is a schematic flowchart of a signal source switching method of a display device according to an embodiment of the disclosure. The signal source switching method shown in FIG. 6 is applicable to the display device 100 shown in FIG. 5, please refer to FIG. 5 and FIG. 6.

In step S610, the control circuit 130 receives the signal source switching command Sw1. The signal source switching command Sw1 may indicate the second signal source device SS2 to be the image signal source of the display device 100. For the convenience of description, the following uses the signal source switching command Sw1 to switch the image signal of the display device 100 from the first signal source device SS1 to the second signal source device SS2 as an example for illustration.

In step S620, when the control circuit 130 receives the signal source switching command Sw1, the control circuit 130 records the current operating states of each of the multiple signal source devices. As shown in FIG. 3, the control circuit 130 respectively records the current operating states of each of the first signal source device SS1, the second signal source device SS2, and the third signal source device SS3. For example, the control circuit 130 may record the current operating states of each of the first signal source device SS1, the second signal source device SS2, and the third signal source device SS3 as shown in Table 1 below.

TABLE 1

| | Current operating state |
|---|---|
| First signal source device | Power-on state |
| Second signal source device | Power-on state |
| Third signal source device | Power-off state |

In step S630, the control circuit 130 receives an active source command of the CEC standard. In step S640, the control circuit 130 determines that the active source command is from the first signal source device SS1 or the third signal source device SS3.

If the active source command is from the first signal source device SS1, in step S650, the control circuit 130 may determine that the active source command is from the first signal source device SS1 and the recorded current operating state of the first signal source device SS1 is the power-on state.

Therefore, when the recorded current operating state of the first signal source device SS1 is the power-on state, in step S660, the control circuit 130 ignores the active source command sent by the first signal source device SS1 according to the signal source switching command Sw1. In step S670, the control circuit 130 controls the switching circuit 110 to configure the second signal source device SS2 indicated by the signal source switching command Sw1 as the image signal source.

On the other hand, if the active source command is from the third signal source device SS3, in step S680, the control circuit 130 determines that the active source command is from the third signal source device SS3 and the recorded current operating state recorded of the third signal source device SS3 is the power-off state. Therefore, in step S690, the control circuit 130 controls the switching circuit 110 to configure the third signal source device SS3 as the image signal source according to the active source command.

To sum up, in the embodiment of the disclosure, the display device includes a switching circuit connected between the receiver circuit and the signal source device. When a signal source switching command from a user is received, the current operating state of each of the signal source devices connected to the switching circuit is recorded. Therefore, when the active source command is received, the display device may determine whether to ignore the active source command based on the recorded current operating state. Thereby, the embodiment of the disclosure may prevent the situation that the user cannot switch the image signal source of the display device smoothly, thereby improving the user experience. Moreover, the embodiment of the disclosure may switch the image signal source of the display device to the signal source device expected by the user while reducing the user operation steps, thereby improving the convenience of operation.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A display device, used for connecting a first signal source device and a second signal source device, including:
a switching circuit, comprising a first connection port and a second connection port respectively correspondingly connected to the first signal source device and the second signal source device;
a receiver circuit, coupled to the switching circuit; and
a control circuit, coupled to the switching circuit and the receiver circuit,
wherein, when the control circuit receives a signal source switching command, the control circuit records a current operating state of each of the first signal source device and the second signal source device,
when the control circuit receives an active source command sent by the first signal source device, the control circuit refers to the current operating state of the first signal source device to control the switching circuit to switch an image signal source to the first signal source device or the second signal source device,
when the current operating state of the first signal source device is a power-on state, the control circuit ignores the active source command sent by the first signal source device according to the signal source switching command.

2. The display device according to claim 1, wherein the first connection port and the second connection port are a plurality of high definition multimedia interface (HDMI) connection ports meeting an HDMI standard, and the active source command comprises a consumer electronics control (CEC) command meeting a CEC standard.

3. The display device according to claim 1, wherein the control circuit records the current operating state of the first signal source device according to a voltage signal of a power pin of the first connection port, and records the current operating state of the second signal source device according to a voltage signal of a power pin of the second connection port.

4. The display device according to claim 1, wherein when the current operating state of the first signal source device is the power-on state, the control circuit controls the switching circuit to configure the second signal source device indicated by the signal source switching command as the image signal source.

5. The display device according to claim 4, wherein when the control circuit receives the signal source switching command, the first signal source device receives a hot plug detect (HPD) signal to switch from a first level to a second level through the switching circuit, so that the first signal source device sends the active source command.

6. The display device according to claim 1, wherein when the current operating state of the first signal source device is a power-off state, the control circuit controls the switching circuit to configure the first signal source device as the image signal source according to the active source command.

7. The display device according to claim 6, wherein the first signal source device sends the active source command in response to a power-on state.

8. A signal source switching method, applicable to a display device comprising a switching circuit, wherein the switching circuit comprises a plurality of connection ports connected to a plurality of signal source devices, the signal source devices comprise a first signal source device and a second signal source device, and the method comprises:
recording a current operating state of each of the signal source devices when a signal source switching command is received; and
referring to the current operating state of the first signal source device to control the switching circuit to switch an image signal source to the first signal source device or the second signal source device when an active source command sent by the first signal source device is received, wherein referring to the current operating state of the first signal source device to control the switching circuit to switch the image signal source to the first signal source device or the second signal source device comprises:

ignoring the active source command sent by the first signal source device according to the signal source switching command when the current operating state of the first signal source device is a power-on state.

9. The signal source switching method according to claim 8, wherein the connection ports are a plurality of HDMI connection ports meeting an HDMI standard, and the active source command comprises a CEC command meeting a CEC standard.

10. The signal source switching method according to claim 8, wherein recording the current operating state of each of the signal source devices comprises:

recording the current operating state of each of the signal source devices according to a voltage signal of a power pin of each of the connection ports.

11. The signal source switching method according to claim 8, wherein referring to the current operating state of the first signal source device to control the switching circuit to switch the image signal source to the first signal source device or the second signal source device comprises:

controlling the switching circuit to configure the second signal source device indicated by the signal source switching command as the image signal source when the current operating state of the first signal source device is the power-on state.

12. The signal source switching method according to claim 11, wherein when the signal source switching command is received, the first signal source device receives a hot plug detect signal to switch from a first level to a second level through the switching circuit, so that the first signal source device sends the active source command.

13. The signal source switching method according to claim 8, wherein referring to the current operating state of the first signal source device to control the switching circuit to switch the image signal source to the first signal source device or the second signal source device comprises:

controlling the switching circuit to configure the first signal source device as the image signal source according to the active source command when the current operating state of the first signal source device is a power-off state.

14. The signal source switching method according to claim 13, wherein the first signal source device sends the active source command in response to a power-on state.

15. A signal source switching method, applicable to a display device comprising a switching circuit, wherein the switching circuit comprises a plurality of connection ports connected to a plurality of signal source devices, the signal source devices comprise a first signal source device and a second signal source device, and the method comprises:

recording a current operating state of each of the signal source devices when a signal source switching command is received; and referring to the current operating state of the first signal source device to control the switching circuit to switch an image signal source to the first signal source device or the second signal source device when an active source command sent by the first signal source device is received, wherein referring to the current operating state of the first signal source device to control the switching circuit to switch the image signal source to the first signal source device or the second signal source device comprises:

controlling the switching circuit to configure the first signal source device as the image signal source according to the active source command when the current operating state of the first signal source device is a power-off state.

* * * * *